United States Patent [19]

Bause

[11] Patent Number: 4,541,272

[45] Date of Patent: Sep. 17, 1985

[54] ELECTRONICALLY CONTROLLED FUEL INJECTION SYSTEM

[76] Inventor: Roland Bause, Schönnfeldstrasse, D-8300 Landshut, Fed. Rep. of Germany

[21] Appl. No.: 494,390

[22] Filed: May 13, 1983

[51] Int. Cl.[4] .............................................. G01M 15/00

[52] U.S. Cl. ........................................ 73/118; 123/494; 356/414

[58] Field of Search ........................... 73/118, 116, 23; 356/300, 326, 331, 319, 72, 409, 410, 414; 123/494

[56] References Cited

U.S. PATENT DOCUMENTS

| | | | |
|---|---|---|---|
| 2,607,899 | 8/1952 | Cary et al. | 356/303 X |
| 2,620,444 | 12/1952 | Heigl et al. | 356/319 |
| 3,646,917 | 3/1972 | Nagy . | |
| 3,696,247 | 10/1972 | McIntosh et al. . | |
| 3,735,127 | 5/1973 | Astheimer | 250/43.5 R |
| 3,750,635 | 8/1973 | Hoffman et al. | 123/357 |
| 4,438,749 | 3/1984 | Schwippert | 123/494 |

FOREIGN PATENT DOCUMENTS

| | | |
|---|---|---|
| 3127991 | 2/1982 | Fed. Rep. of Germany . |
| 2233497 | 10/1975 | France . |
| 2052108 | 1/1981 | United Kingdom . |

OTHER PUBLICATIONS

Bokemuller, A. Beiträge zur Kraftstoff . . . der Abgase, from Jahrbuch Der Brennkrafttechnischen Gesellschaft E.V. vol. 20, 1939, pp. 27-40.

*Primary Examiner*—Jerry W. Myracle
*Attorney, Agent, or Firm*—Spencer & Frank

[57] ABSTRACT

Electronically controlled fuel injection system for mixture-compressing, externally ignited internal-combustion engines, including at least one suction pipe connected via the intake valve path with at least one combustion chamber of the engine, an electrically controllable injection valve disposed at the suction pipe to supply the fuel, a measuring device effective in the suction pipe, and an electronic control circuit operatively connected at its input with the measuring member and at its output with the injection valve. The measuring device is an electro-optical spectrometer which analyzes the fuel-air mixture sucked in by the engine so as to determine the fuel-air ratio of the mixture, and the electrical control circuit is a comparison circuit which compares the mixture-dependent electrical output signals of the spectrometer with a preset desired value.

17 Claims, 5 Drawing Figures

ELECTRONICALLY CONTROLLED FUEL INJECTION SYSTEM

The invention relates to an electronically controlled fuel injection system for mixture-compressing, externally ignited internal-combustion engines including the features of the preamble of claim 1. Known injection systems of this type essentially comprise a suction pipe which is connected, via the intake valve path, with at least one combustion chamber of the engine. The fuel is injected into the suction pipe through an electronically controlled injection valve, the control of the injection valve being effected by means of an electronic control circuit which reacts to a measuring device that itself is disposed in the suction pipe. The measuring device is designed as a heating wire which is fed by current and held at a precisely defined desired temperature (approximately 200° C.). The stream of air in the suction pipe removes heat from the heating wire so that the wire tends to cool off. To regulate the temperature of the heating wire so that it remains at a constant level, a heat sensor is provided in the immediate vicinity of the heating wire or at the wire itself so as to measure the temperature of the heating wire. The temperature-dependent voltage of the heat sensor is fed into the electronic control circuit which again—in dependence on the thermovoltage—regulates the current flowing through the heating wire so that the temperature of the heating wire is kept constant at the desired temperature. The greater the amount of air passing through the suction pipe, the greater is the regulating current so that the regulating current is a reference value for the amount of air passing through the suction pipe. The electronic control circuit now regulates the injection valve so that the quantity of fuel supplied to the suction pipe is adapted to the quantity of air sucked in and the best possible combustion mixture is realized.

The drawback of the known system is that the measuring member physically present in the suction channel has an adverse influence on the flow conditions in the suction pipe and, furthermore, it is absolutely necessary to tune the system from time to time since in the known system only one of the two parameters of quantity of air and quantity of fuel, namely the quantity of air, is being measured. The necessary tuning is generally done in that, with the engine running, the CO content of the exhaust gas is measured and a conclusion is drawn from its CO content about the composition of the mixture.

It is the object of the invention to provide a fuel injection system which operates without sensor elements projecting into or through the suction channel and which, independently of engine parameters or wear and misalignment phenomena, assures an optimum fuel mixture setting by direct and complete measurement of the composition of the mixture.

The invention solves this in that the measuring device is an electrooptical spectrometer which analyzes the fuel-air mixture sucked in by the engine as to its composition (fuel - air) and the electronic circuit is a known comparison circuit which compares the mixture-dependent electrical output signals of the spectrometer with a preset desired value. The initial advantage of this fuel injection system is that the suction system can be designed for optimum flow since no mechanical measuring members are required in the suction channel. The light source of the spectrometer as well as the light-sensitive element are disposed outside the suction pipe cross section in such a way that the light beam passes through the walls of the suction pipe by means of windows or the like. Another advantage is that the injection system according to the invention can be used without tuning work for all mixture-compressing internal-combustion engines. It is even possible without undue expense to retrofit already operational internal-combustion engines with this spectral analysis controlled fuel injection system.

In the simplest case, the spectrometer is provided with a narrowband or monochromatic light source whose wavelength corresponds—for example by way of filtering—to the wavelength absorbed completely or in part by the optimum composition of the fuel-air mixture. The sensor is a photoelectric component, for example a photoelement or a photodiode, whose spectral sensitivity is adapted to the selected light wavelength. Emission spectrometers as well as extinction spectrometers can be used. It is also within the scope of the invention to perform the measurement nephelometrically or colorimetrically, i.e. to determine the "droplet quantity" or the "color density" in the air-fuel mixture and to effect the injection valve control by means of this parameter.

It is also within the scope of the invention to excite, by means of two light beams of different wavelengths, transitions, oscillations or rotations of different molecules or atoms in each one of the two components of the mixture and to determine from the ratio of the two separately measured signals the respective mixture composition and to regulate it via the injection valve.

Claims 7 and 8 teach measures which are advantageous for realizing a favorable signal to noise ratio in the measurement and with which it is possible to precisely regulate the fuel mixture. Particularly by means of the phase and/or frequency selective lock-in technology, it is possible to easily eliminate interfering engine vibration signals from the measuring signal. Claims 9 and 10 further teach to superpose additional signals on the spectroscopically determined basic signal or to supplement it by further signals, for example during the warm-up or idling phase.

Measurements have shown that the stated wavelength range permits a particularly sensitive determination of the mixture composition since the customary fuels exhibit several absorption maxima in this range. Preferably, the light beam penetrates a representative sample of the in-flowing fuel-air mixture which is conducted through a so-called bypass system of the suction pipe. It is, moreover, of advantage for the inflowing fuel to be heated before it reaches the measuring location so as to completely evaporate it.

Range indications for the absorption maxima are given in claim 14, preferrred light sources in claim 15 and preferred filters in claim 16.

The invention will now be explained in greater detail with the aid of an embodiment that is illustrated in the drawing figures. It is shown in:

FIG. 1, a schematic representation of a suction pipe with spectrometer arrangement and injection valves as well as the circuit arrangement;

FIG. 2, the absorption spectrum of a fuel in the wavelength range between 0.7 micron and 2.2 microns.

Figure 1:
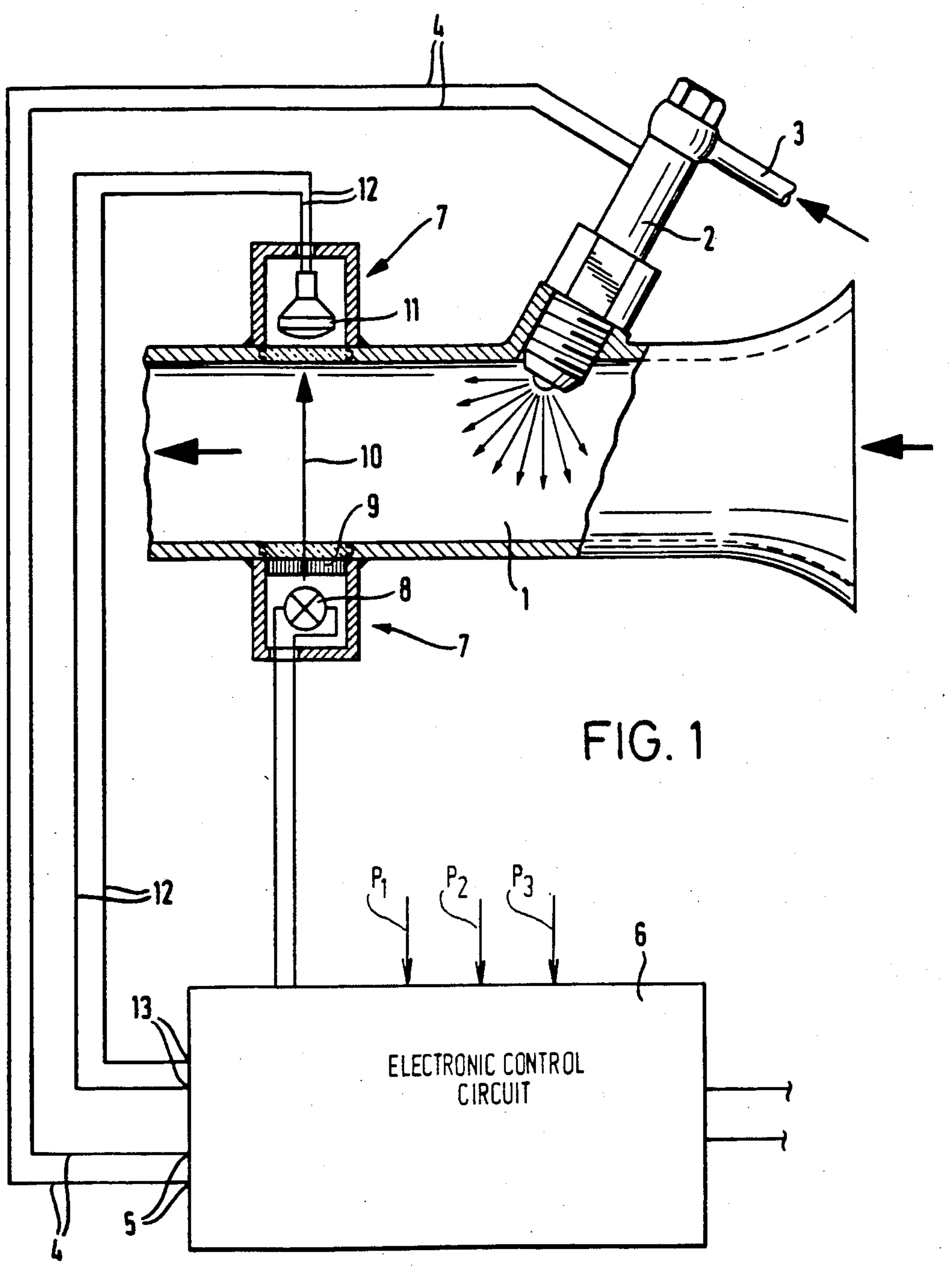

The electronically controlled fuel injection system essentially comprises a suction pipe 1, with an electronically controlled injection valve 2 being disposed in the customary manner at the side of the suction pipe and connected with fuel line 3. The incoming fuel produces a gasoline-air mixture in the interior of the suction pipe with a composition which depends on the length of time the injection valve is open. The time the injection valve 2 is open is regulated via a control line 4 which is connected with the output 5 of an electronic control circuit 6 that may be a customary actual value/desired value comparison circuit.

Spectrometer 7 essentially comprises a light source 8 and a spectral filter 9 which optically follows the light source in the beam path and which permits only light of a defined wavelength to pass. The light beam 10 passes through the suction pipe at a right angle and impinges on the photosensitive detector 11 disposed on the opposite side of suction pipe 1. In dependence on the incident intensity, this detector 11 generates an electrical voltage signal which is fed via signal line 12 to the signal input 13 of the electronic control circuit 6.

In the control circuit, the signal generated by the detector is compared with a once-determined desired value and the time the injection valve is open is regulated (lengthened or shortened) via the control line in dependence on the deviation from the desired value.

In further accordance with the invention, electronic control circuit 6 can be provided with further inputs, such as input P1 providing a signal representing engine temperature, input P2 providing a signal representing engine rpm and input P3 providing a signal representing the temperature of the air being drawn into suction pipe 1. Circuit 6 can utilize one or more of these signals, in a manner which is now conventional in the art, to control injection valve 2.

Figure 2:
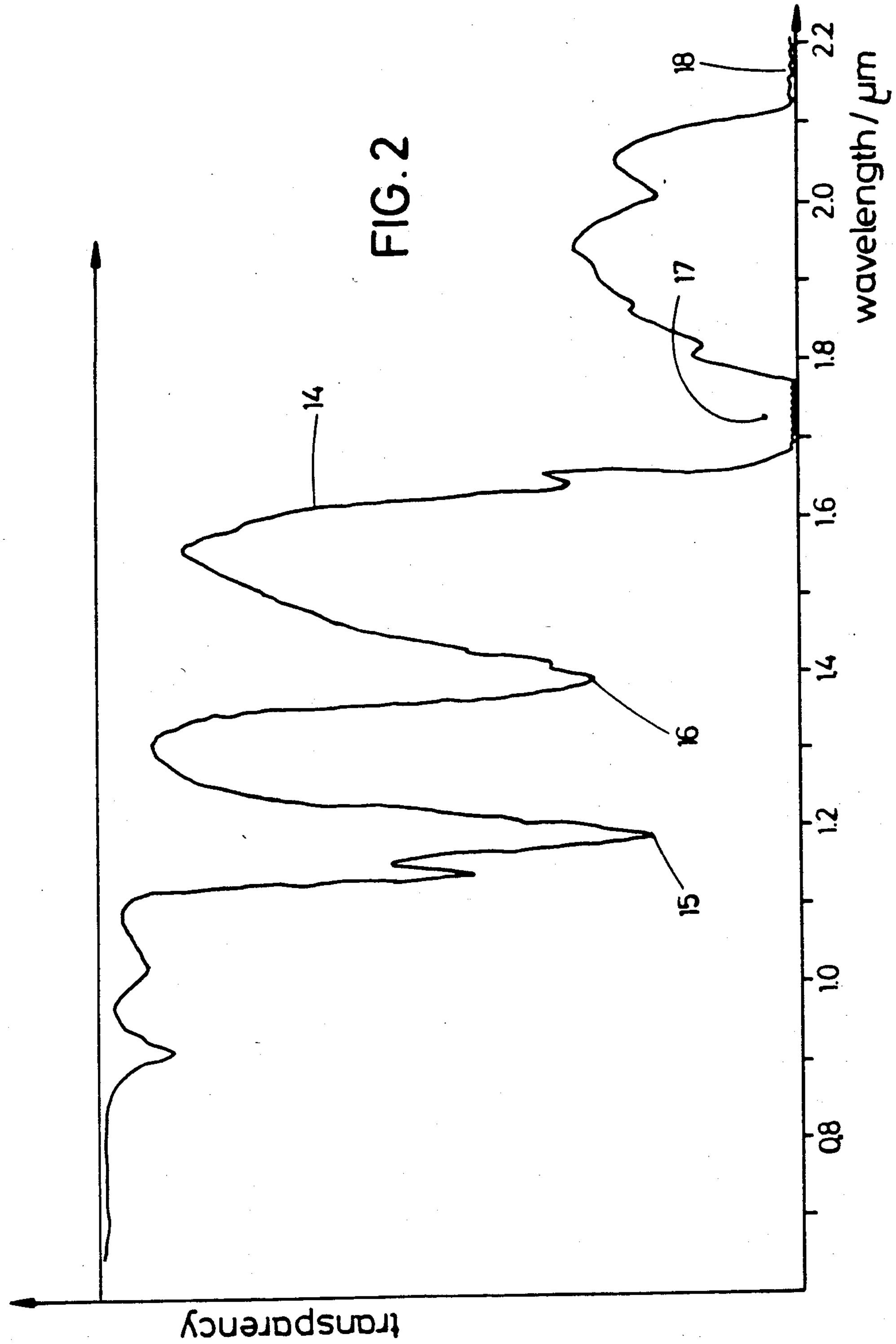

The spectrum 14 shown as an example in FIG. 2 is particularly suitable for performing the measurement with a favorable signal to noise ratio. If the spectrometrically determined light absorption in the fuel is effected in a wavelength range of one of the absorption maxima 15-18, which can be realized by suitable filtering of the light or suitable selection of the light source, even the slightest changes in the mixture ratio already have a strong effect on the actual absorption and thus on the quantity of transmitted light so that the intensity fluctuations detected by detector 11 can be transmitted to the control circuit 6 as strong electrical signals.

Figure 3:
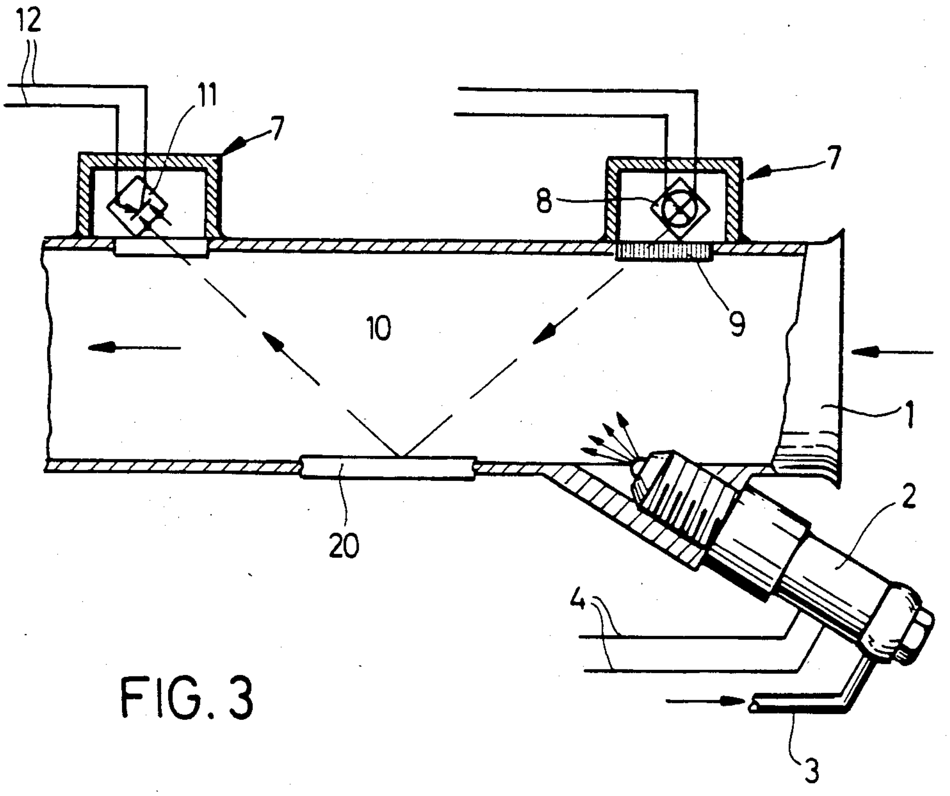
FIG. 3 is a schematic representation of a modified portion of the structure of FIG. 1.

FIG. 3 shows a further embodiment of the invention in which light beam 10 passes through suction pipe 1 at an acute angle to the axis of the suction pipe. For this purpose, light source 8 is oriented to direct light beam 10 through filter 9 and pipe 1 at an acute angle to the pipe axis onto a reflector 20 which reflects beam 10, again at an acute angle to the pipe axis, toward detector 11.

Figure 4:
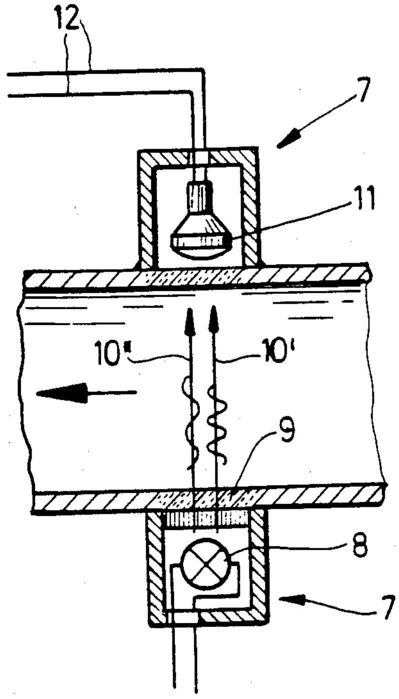
FIG. 4 is a schematic representation of a modified portion of the structure of FIG. 1.

FIG. 4 shows a further embodiment of the invention which differs from that of FIG. 1 in that two parallel light beams 10′ and 10″ having respectively different wavelengths are emitted in place of the single beam 10 of FIG. 1.

Figure 5:
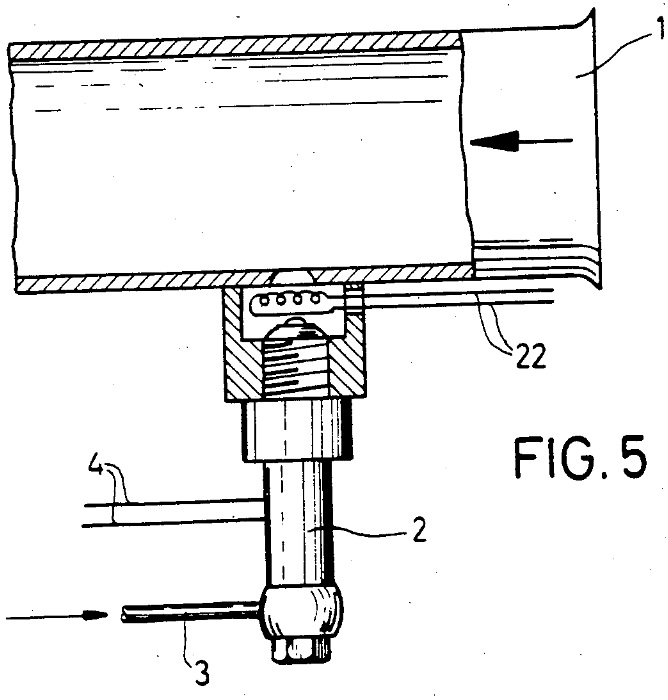
FIG. 5 is a schematic representation of a modified portion of the structure of FIG. 1.

FIG. 5 shows a further embodiment of the invention in which a heating element 22 is disposed in front of the outlet of valve 2 for heating the inflowing fuel before it reaches the measuring location so as to cause the fuel to completely evaporate.

I claim:

1. Electronically controlled fuel injection system for mixture-compressing, externally ignited internal-combustion engines, the system including:

at least one suction pipe (1) connected via the intake valve path with at least one combustion chamber of the engine;

an electrically controllable injection valve (2) disposed at the suction pipe to supply the fuel;

a measuring device effective in the suction pipe (1); and an electronic control circuit (6) operatively connected at its input with the measuring member and at its output with the injection valve;

characterized in that the measuring device is an electrooptical spectrometer (7) which analyzes the fuel-air mixture sucked in by the engine so as to determine the fuel-air ratio of the mixture; and the electrical control circuit (6) is a comparison circuit which compares the mixture-dependent electrical output signals of the spectrometer (7) with a preset desired value.

2. Injection system according to claim 1, characterized in that the spectrometer (7) is an emission spectrometer having a narrowband or monochromatic light source (8).

3. Injection system according to claim 1, characterized in that the spectrometer (7) is an extinction spectrometer.

4. Injection system according to claim 1 or 3, characterized in that the light beam (10) of the spectrometer (7) passes through the suction pipe (1) at approximately a right angle.

5. Injection system according to claim 1 or 3, characterized in that the light beam (10) of the spectrometer (7) passes through the suction pipe (1) at an acute angle with respect to the pipe axis.

6. Injection system according to claim 1 or 3, characterized in that two light beams (10) of different wavelengths pass through the suction pipe (1) so as to excite different types of atoms/molecules.

7. Injection system according to claim 1 or 3, characterized in that the spectrometer includes a light source (8) designed as a high power pulsed light source.

8. Injection system according to claim 1 or 3, characterized in that the measurement is effected so as to be phase and/or frequency selective.

9. Injection system according to claim 1 or 3, characterized in that the electronic control circuit (6) utilizes further engine parameters to control the injection valve (2).

10. Injection system according to claim 1 or 3, characterized in that during the starting and idling phase, the output signal of the electronic control circuit (6) is superposed by further signals.

11. Injection system according to claim 1 or 3, characterized in that the light wavelength used for the measurement lies in a range between 0.1 micron and 2.5 microns.

12. Injection system according to claim 1 or 3, characterized in that the light beam passes through a representative sample of the inflowing fuel-air mixture which is conducted through a so-called bypass system of the suction pipe.

13. Injection system according to claim 1 or 3, characterized in that the inflowing fuel is heated before it reaches the measuring location so as to cause it to completely evaporate.

14. Injection system according to claim 1 or 3, characterized in that the wavelength of the light source for the spectrometer lies at 1.2 microns, 1.4 microns or 1.7 microns.

15. Injection system according to claim 1 or 3, characterized in that the light source (8) for the spectrometer is a halogen lamp, an incandescent lamp, a deuterium lamp, a light emitting diode or a laser diode.

16. Injection system according to claim 1 or 3, characterized in that the spectrometer includes interference filters or colored glasses.

17. Injection system according to claim 1 wherein said suction pipe has a region of constant cross section downstream of said valve, and said measuring device is located downstream of said valve and outside of the cross section of said suction pipe.

* * * * *